United States Patent [19]

Wu et al.

[11] Patent Number: 4,875,375

[45] Date of Patent: Oct. 24, 1989

[54] AXIAL-TORSIONAL EXTENSOMETER

[75] Inventors: Han-Chin Wu; Zhiyou Xu, both of Iowa City, Iowa

[73] Assignee: University of Iowa Research Foundation, Iowa City, Iowa

[21] Appl. No.: 318,547

[22] Filed: Mar. 3, 1989

[51] Int. Cl.[4] ............................................. G01N 3/00
[52] U.S. Cl. ................................................... 73/795
[58] Field of Search .................... 73/794, 795; 33/739, 33/747, 787–789, 792, 793, 805, 807, 819, 820, 832, 833

[56] References Cited

U.S. PATENT DOCUMENTS

| a,539,851 | 9/1985 | Lutenegger . | |
|---|---|---|---|
| 2,077,598 | 4/1937 | Von Heydekampf | 33/790 |
| 2,827,705 | 3/1958 | Elliott et al. | 33/793 |
| 2,885,888 | 5/1969 | Kotanchik et al. . | |
| 3,180,137 | 4/1965 | Tannenberg . | |
| 3,295,365 | 1/1967 | Larrigan et al. | 33/790 |
| 3,338,092 | 8/1967 | Lindholm et al. . | |
| 3,362,216 | 1/1968 | Hardin et al. . | |
| 3,605,488 | 9/1971 | Foster . | |
| 3,614,834 | 10/1971 | Holt et al. | 33/788 |
| 3,696,512 | 10/1972 | von Marinelli et al. | 33/790 |
| 4,160,325 | 7/1979 | DeNicola | 33/788 |
| 4,182,190 | 1/1980 | Huber et al. . | |
| 4,537,082 | 8/1985 | Meline et al. | 73/794 |
| 4,607,531 | 8/1986 | Meline et al. | 73/794 |

Primary Examiner—Robert R. Raevis
Attorney, Agent, or Firm—Henderson & Sturm

[57] ABSTRACT

An axial-torsional extensometer for measuring deformation of a specimen subjected to combined axial-torsional loading conditions. The extensometer includes a first holder plate having a first set ring which includes means for securing it to a specimen at a first axial location. A first pair of guide tubes are attached to the first holder plate and are disposed on opposite sides of the first set ring. A second holder plate has a second set ring rotatably attached to it and includes means for securing the second set ring to a specimen at a second axial location axially spaced from said first axial location. A second pair of guide tubes are attached to the second holder plate and disposed on opposite sides of the second set ring. The second pair of guide tubes are disposed to a telescopically engage the first pair of guide tubes. A pair of linear variable differential transducers are attached to and disposed within the telescopically engaged first and second pairs of guide tubes for measuring the axil deformation of the specimen. A pair of rotary variable differential transducers are attached to the second holder plate and disposed at opposite sides of the second set ring. The rotary variable differential transducers are operably attached to the second set ring and measure the torsional deformation of the specimen. Two or more pairs of linear variable differential transducers are mounted on the first and second set rings to measure diametral strains.

10 Claims, 4 Drawing Sheets

AXIAL-TORSIONAL EXTENSOMETER

TECHNICAL FIELD

This invention relates to a device for use in material testing, and more particularly to an axial-torsional extensometer suitable for use in the experimental investigation of multiaxial plastic deformation and fatigue fracture under moderately large strain range.

BACKGROUND ART

In the area of constitutive modeling of mechanical behavior of engineering materials, finite deformation has become a subject of intense interest in the mechanics community. Design of equipment and processes for finite deformation is usually supported by calculations involving stress and deformation analysis of metal components at large plastic deformation level. These calculations include the problems of fabrication processes, metal forming, and impact.

Theorists have enjoyed certain degrees of success by proposing numerous concepts such as elastic-plastic decomposition of deformation gradient, co-rotational rate for the kinematical and state variables, plastic spin, choice of unstressed configuration, distinction between the kinematics of continuum and its underlying substructure, representation of substructure and texture, physical interpretation of internal variables, and the evolution of these variables. Computation and implementation of constitutive models at the finite strain range are available. However, the application of computer codes to predict plastic deformation responses has had limited success. While the computational schemes in modern codes have reached a high level of sophistication, these advances have not been matched with the development of more accurate constitutive equations.

In the development of more accurate constitutive equations, there are disparate views on the manner in which material deformation and rotation affect the evolution of anisotropy. Some of these disparities may be resolved by further theoretical investigation; however, some will have to rely on experiment, particularly under multiaxial loading condition. Additional investigation including strain hardening, yield surface measurements, cyclic loading, and strain-rate effect would provide an extensive material data base for use in the development of constitutive equations.

Most available experimental results for deformation of metals under multiaxial loading condition are for small strain range. This is largely due to the limitation of transducers used in the strain measurement. Typically, strain gages and commercially available axial-torsional extensometers (Instron and MTS) have a limit of less than two percent strain. Some experimental data for combined axial-torsional loading of metal tubes have been reported in this strain range. These data are extremely useful in the development and verification of constitutive models at small strain level.

Transducers that measure and control normal and shear strains at large strain range are not generally available, particularly for combined axial-torsional loading condition. A need exists for this kind of experimental data which may be used by the theorists to develop and verify constitutive models at large strain range. In addition, the experimental investigation has an independent value and its importance should be recognized in its own right.

The design of strain transducer for finite strain requires mastering of sophisticated techniques in engineering. Several technical problems need to be overcome. Two factors affect the strain range of an experiment — the specimen geometry and test method, and the strain measuring device.

Different specimen geometries and test methods have been reported and are the primary factor in the determination of strain limits. Uniaxial tension or compression with specimen remachining can lead to large plastic strain. However, remachining interrupts the experiment which is undesirable. Also, lubrication is an important issue in compression tests. Torsion of very short thin-walled tubes, or the "Lindholm tube geometry", suffers from a second order length change and buckling instabilities. End effects may also influence stress uniformity. These two types of tests do provide valuable information concerning texture development at very large strain. Other tests include torsion of round solid bars which has strain gradient and indirect tests such as wire drawing and tension, etc. Although these tests are applicable for very large strain range, complications do arise in these tests.

Combined axial-torsion of thin-walled tube is an ideal test for the study of constitutive equation. This test is, however, limited to moderately large strain range due to buckling or fracture depending on material tested and specimen geometry. Even though it is known that in this moderate strain range, the change of texture is not significant, the combined axial-torsional test in this strain range is still a valuable test in that it may be used to investigate the anisotropic rate of strain hardening, cyclic properties of material, and fatigue life due to cumulative damage. The distortion of yield surface and the path dependent rate of kinematic hardening have occurred at small plastic strain range and their occurrence at moderately large strain range is of special interest. Furthermore, this test is suitable for the investigation of effects due to rotation, multi-axial stress/strain coupling, and stress/strain cycling.

A brief summary of existing strain transducers for axial-torsional test follows:

Extensometer of Brown and Miller: The extensometer is attached to the specimen by three tool-steel pins at each end of the 25 mm gage length. The pins are spring loaded to compensate for the radial strains arising in the specimen. The axial strain is measured by the average of two linear variable differential transformer (LVDT) readings to eliminate bending errors, and the torsional strain is determined from a wire-wound potentiometer whose spindle and body, respectively, are rotated by a pair of pulleys, one from each end of the gage length. The gage length is set initially by plastic spacing pieces to within plus or minus 0.3%. Applications to axial strain of up to 2% and shear strain of up to 4% have been reported.

Strain Measuring Device of Moon and Bell: The axial strain and the angle of twist are measured independently. This is accomplished by means of small brass collars glued to the specimen at a fixed distance apart. The collars can rotate in well-lubricated guide disks, which can slip up and down along well-lubricated guide rods. Two clip gages were attached to the opposite sides of these guide disks. Thus, any longitudinal elongation is transmitted to these clip gages by the guide disks. The angle of twist is measured by means of a wheel attached to the lower grip and a vernier scale. Strain measurements up to 12% axial and 27% torsional have been achieved. However, shear strain is obtained from the rotation of lower grip, not representative of the actual shear strain of the gage section; furthermore, brass collars restrict diametral change during experiment.

Extensometer of Khan and Parikh: This is an updated version of the design of Moon and Bell. The improvement is in the use of a rotary variable differential transducer (RVDT) to measure the angle of twist between the two grips. A rubber ring and a wheel are used to transmit the rotation of the grip to the RVDT. However, the two drawbacks cited in connection with the device of Moon and Bell still exist in this version.

Extensometer of Socie: The extensometer is inside the tubular specimen. This is a special design to allow for outside surface of the specimen easily replicated with acetyl cellulose film to monitor crack formation and growth. Axial displacements are measured and controlled with a LVDT located on the centerline of the specimen and rotations measured with a RVDT. Applications to axial strain of up to 1% and shear strain of up to 1.5% have been reported.

Extensometer of Liu: The strains are calculated from the relative displacements measured from two reference gage points assumed on the uniform section of the specimen. The basic elements are two assemblies of universal joints; each operates independently to monitor the motion of the respective reference gage point via a ceramic extension probe. Three cantilever-type transducers are used; two are for the circumferential displacement measurements and a third for the axial differential displacement. The device is capable of measuring plus or minus 5% axial and plus or minus 5% shear strain, with a gage length of 20 mm.

Capacitance Strain Transducer of Yeakley and Lindholm: The extensometer mounts inside the tubular specimen and grips. It is water cooled for elevated temperature operation. The extensometer consists of an armature (or rotor) containing one set of capacitance plates and a concentric housing (or stator) containing a second set of plates. The extensometer is supported on axes inside the hollow tubular specimen by six spring-loaded reference arms. The arms have knife-edge tips at the end where they contact the inner wall of the specimen. The gage length is normally 12.7 mm, but it can be changed to give a variable gage length of 1 to 6 cm. The armature contains a set of four active capacitance plates. Each covers a 45 degree arc. The armature plates are driven with a constant amplitude carrier signal and act as the driven elements for both axial motion and rotation motion. The housing contains ten separate capacitance plates. The two outer rings along with the armature form two arms of a capacitance half-bridge sensitive to axial strain only. The center segments are alternately connected to form the two output capacitance elements for rotational measurement. Along with the armature plates, these form two arms of a torsional-strain half-bridge. The axial dynamic range is 10% and torsion is plus or minus 22.5°. The structure of this extensometer is complicated.

As discussed in the previous section, an axial-torsional extensometer for large strain range is still not available commercially. Although there are several devices designed by research workers and have appeared in the literature, they all have limitations in terms of suitable type of experiment, strain limits, whether or not the measured shear strains are truly representative of strains at the gage section of the specimen, and error bounds.

Those concerned with these and other problems recognize the need for an improved axial-torsional extensometer.

DISCLOSURE OF THE INVENTION

The present invention provides an axial-torsional extensometer for measuring deformation of a specimen subjected to combined axial-torsional loading conditions. The extensometer includes a first holder plate having a first set ring which includes means for securing it to a specimen at a first axial location. A first pair of guide tubes are attached to the first holder plate and are disposed on opposite sides of the first set ring. A second holder plate has a second set ring rotatably attached to it and includes means for securing the second set ring to a specimen at a second axial location axially spaced from said first axial location. A second pair of guide tubes are attached to the second holder plate and disposed on opposite sides of the second set ring. The second pair of guide tubes are disposed to telescopically engage the first pair of guide tubes. A pair of linear variable differential transducers are attached to and disposed within the telescopically engaged first and second pairs of guide tubes for measuring the axial deformation of the specimen. A pair of rotary variable differential transducers are attached to the second holder plate and disposed at opposite sides of the second set ring. The rotary variable differential transducers are operably attached to the second set ring and measure the torsional deformation of the specimen. Two or more pairs of linear variable differential transducers are mounted on the first and second set rings to measure diametral strains.

An object of the present invention is the provision of an improved axial-torsional extensometer.

Another object of the present invention is to provide a device useful for recording data over a large strain range.

Still another object of the present invention is to provide a device that will measure with high accuracy combined axial-torsional strains at large strain range.

A still further object of the present invention is the provision of a device that will measure strains at the gage section of the specimen.

Yet another object of the present invention is the provision of a device that will provide signals for feedback control so that strain controlled experiments in addition to stress controlled experiments may be performed.

Still a further object of the present invention is the provision of a device that will be useful for low-cycle fatigue testing.

Still yet another object of the present invention is the provision of a device that will measure the diameter change of the specimen.

BRIEF DESCRIPTION OF THE DRAWINGS

These and other attributes of the invention will become more clear upon a thorough study of the following description of the best mode for carrying out the invention, particularly when reviewed in conjunction with the drawings, wherein.

BEST MODE FOR CARRYING OUT THE INVENTION

Figure 1:
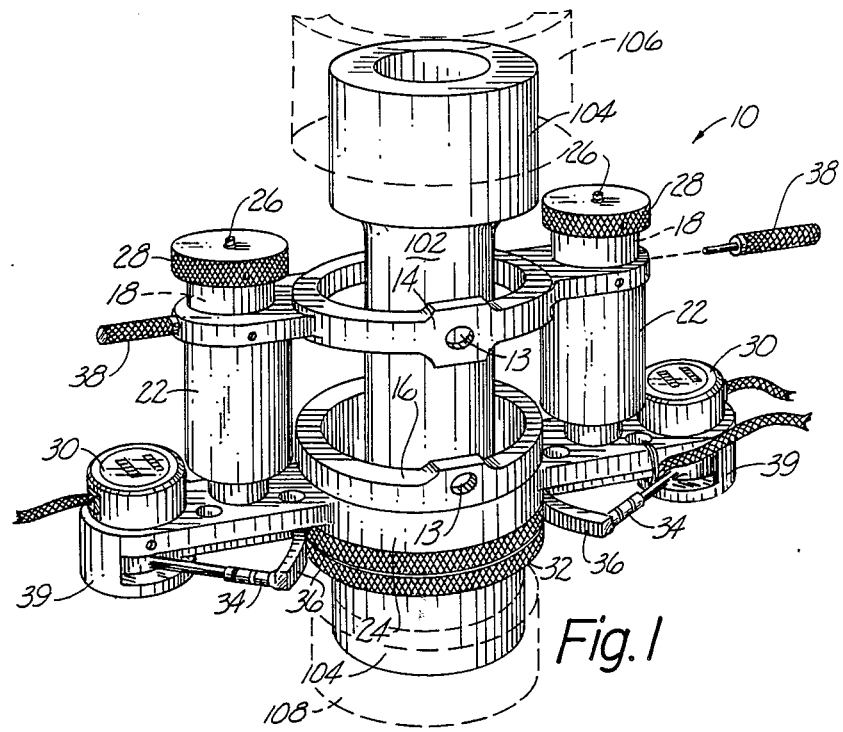
FIG. 1 is a perspective view of the axial-torsional extensometer of the present invention attached to a specimen.
Figure 2:
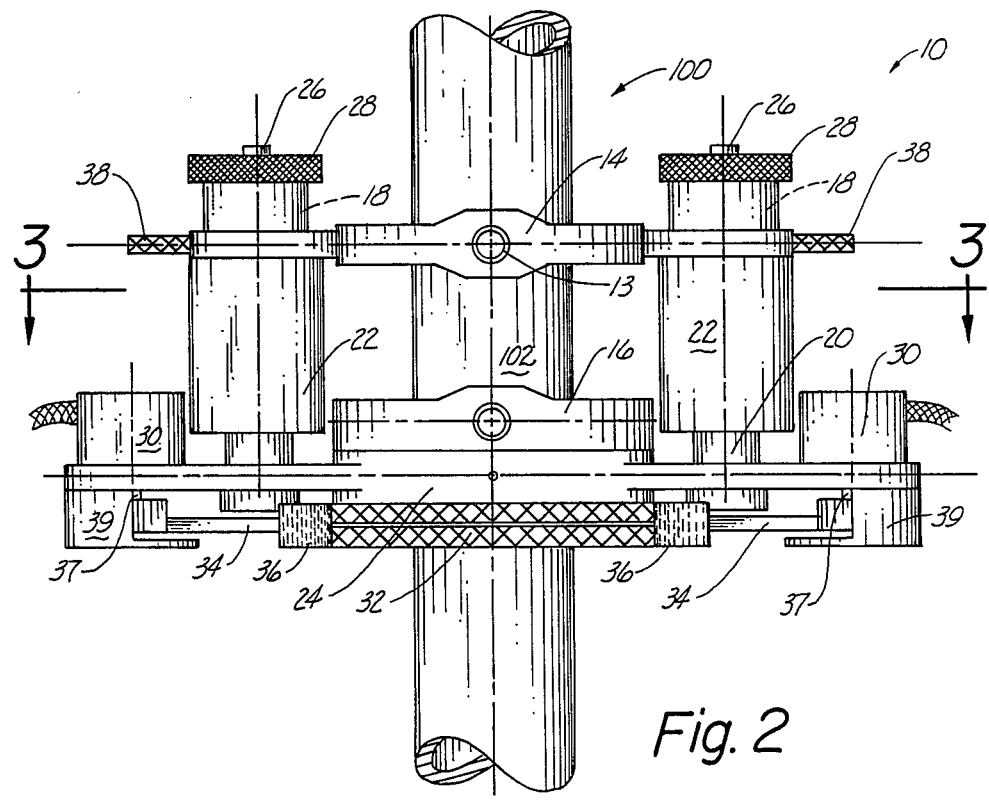
FIG. 2 is a front elevational view showing the extensometer attached to the gage section of the specimen.
Figure 3:
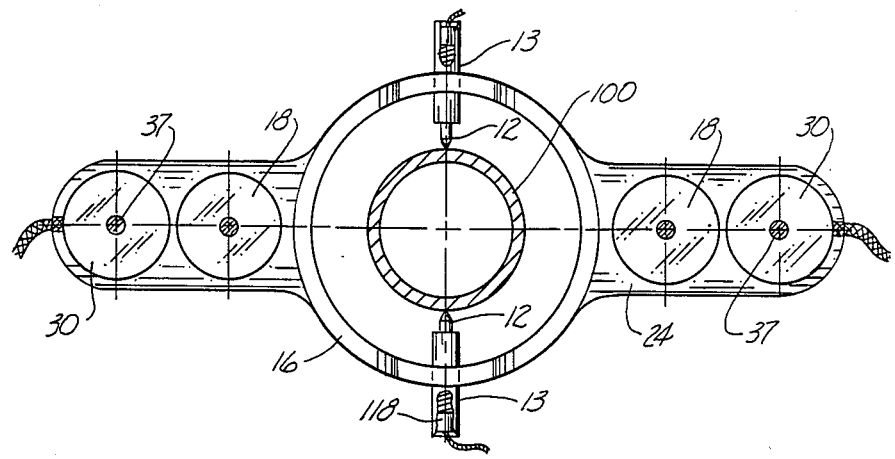
FIG. 3 is a top plan sectional view taken along line 3—3 of FIG. 2.

Referring now to the drawings, wherein like reference numerals designate identical or corresponding parts throughout the several views, FIG. 1 depicts the extensometer (10) of the present invention. FIG. 2 shows the extensometer (10) mounted on a specimen (100). The extensometer (10) is attached to the specimen (100) by two tool-steel spring-loaded pins (12) at each end of the gage length (102) through the upper and lower set rings (14 and 16). The pins (12) are spring loaded to compensate for the radial strain as a result from large deformation. The axial strain (relative elongation of the gage section (102) is measured by two LVDT's (18). Each LVDT (18) is mounted inside of an interior guide tube (20), which in turn slides, by use of a linear motion bearing, within an exterior guide tube (22) during axial deformation. The two exterior guide tubes (22) are rigidly attached to the upper set ring (14) and the interior tubes (20) with the LVDT's (18) fixed to a holder plate (24) as shown in FIGS. 1–3. The axes and the cores of the two LVDT's (18) are set to be parallel with the core attached to the base (26) located at the exterior guide tube cap (28). The axial strain is then obtained by averaging the two LVDT readings. Two readings are averaged to reduce errors of bending.

The torsional strain (relative rotation of the gage section (102) is measured by two RVDT's (30) which are mounted next to the LVDT's (18) on the holder plate (24). The assembly of the holder plate (24), the lower set ring (16), and a knurly surface ring (32) is specially designed to allow the lower set ring (16) to freely rotate with respect to the holder plate (24) and to prevent any sliding between the two elements along the axial direction. The knurly surface ring (32) is fixed to the lower part of the lower set ring (16) so that they turn together. The assembly transmits the relative rotation of the specimen (100) within the gage section (102) to the two RVDT's (30) where the two readings are averaged to minimize any error induced by inaccurate centering of the two RVDT's (30). Any rotation of the specimen (100) within the gage section (102) simply causes the lower set ring (16) and the knurly surface ring (32) to rotate. Through two brackets (34), having circular arc shaped contact surface (36), the rotation of the knurly surface ring (32) is transmitted to the shafts (37) of the two RVDT's (30). The circular arc shaped contact surfaces (36) of the two brackets (34) are covered with rubber for easy transmission of rotation. A shield (39) provides protection for the mechanism.

The LVDT's (118) used to measure the diametral displacement are mounted inside the housing (13) of the pins (12) and determine the accuracy of the diametral displacement.

Independent measurements of the axial and torsional strains for the gage section (102) have been achieved. The gage length (102) is set by two aligning holes and pins (38) to an accuracy of plus or minus 0.3%. There is one aligning hole in each of the interior guide tubes (20) and in each of the exterior guide tubes (22). Setting the pins (38) through these holes ensures alignment and thereby sets the gage length (102). The pins (38) are removed from the holes after the upper set ring (14) is attached to the specimen (100) and before the forces are applied. A feasible range of gage length (102) is 1.0–2.0 inches. Once the gage length (102) is set, the extensometer (10) is attached to the specimen (100) and the enlarged ends (104) of the specimen (100) are secured in upper and lower grips (106 and 108).

The specifications of this extensometer have been determined and listed in Table 1.

TABLE 1

| AXIAL-TORSIONAL EXTENSOMETER | | |
|---|---|---|
| | | Specifications |
| Round Specimen Size, | OD | 1.0~1.5 inches |
| Max. Travel Range, | Axial* | ±0.4 inches |
| | Torsion** | ±25° |
| | Diametral | ±0.1 inches |
| Gauge Length | | 1.0~2.0 inches with ±0.3% accuracy |
| Linearity | Axial | 0.30% full scale |
| | Torsion | 0.30% full scale |
| | Diametral | 0.30% full scale |
| Max. Crosstalk | Axial to torsional | 0.1% full scale |
| | Torsional to axial | 0.1% full scale |
| Max. Hysteresis | Axial | 0.20% full scale |
| | Torsion | 0.20% full scale |
| | Diametral | 0.20% full scale |

Figure 4:
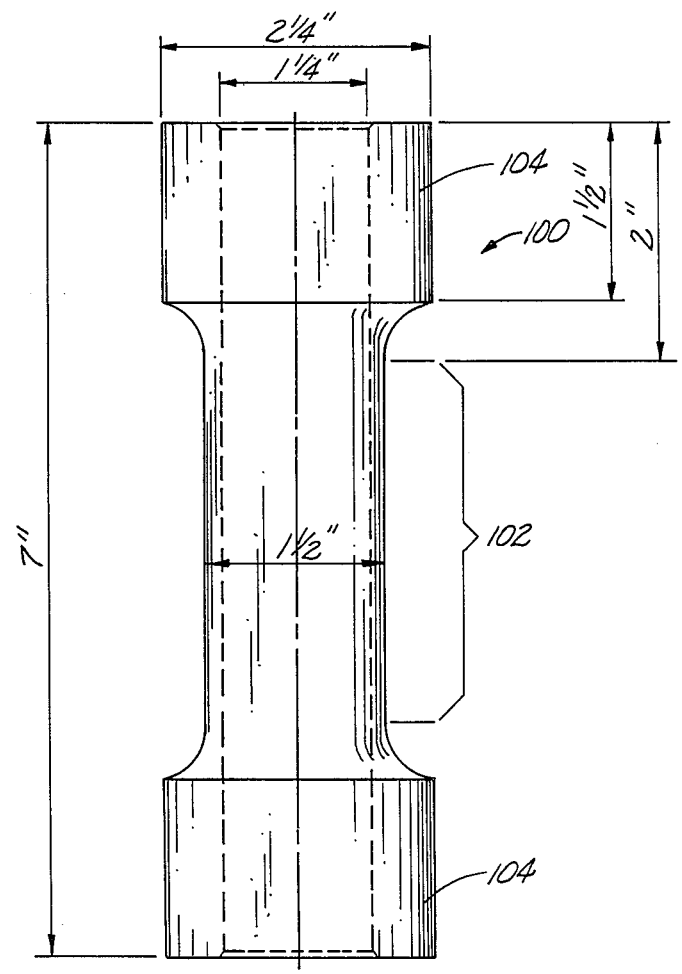
FIG. 4 is an elevational view of a specimen as used with the present invention showing the enlarged ends adapted to be received in the grips.

*These values are for specimen dimensions shown in FIG. 4. The max. travel range can be increased by lengthening the grip sections of the specimen and by using LVDT's of larger travel range. A travel range of −0.8~+0.8 inches can be achieved.
**Up to plus or minus 50° is possible.

Calibration of axial and diametral displacements were carried out by use of a MTS Axial Sensor Calibrator with plus or minus 10 volts corresponding to an axial displacement of plus or minus 0.4 inches and to a diametral displacement of plus or minus 0.1 inches. Calibration of rotation was carried out by use of a rotation stage. A voltage of plus or minus 10 volts corresponds to a rotation of plus or minus 25 degrees. The calibration data are presented in Table 2. Hysteresis was determined by the difference in voltage per 10 volts at a specified displacement (or rotation) during a cycle of displacement (or rotation).

TABLE 2

| CALIBRATION OF EXTENSOMETER MODEL RAT-102 | | | | | |
|---|---|---|---|---|---|
| Gauge Length: 1.500 inch ±0.30% | | | | | |
| Excitation Voltage: 11.600 (V) | | | | | |
| AXIAL: Range: +0.400/−0.150 inches | | | | | |
| Displacement | Output (Volts) | | Theoretical | Average | Linearity |
| (Degrees) | Forward | Backward | Value (Volts) | Output (V) | (%) |

TABLE 2-continued

CALIBRATION OF EXTENSOMETER MODEL RAT-102

| -0.1500 | -3.716  | -3.716  | -3.750  | -3.733  | -0.17 |
|---------|---------|---------|---------|---------|-------|
| -0.1000 | -2.509  | -2.497  | -2.500  | -2.512  | +0.12 |
| -0.0500 | -1.261  | -1.248  | -1.250  | -1.263  | +0.13 |
| 0.0000  | 0.000   | +0.017  | 0.000   | 0.000   | 0.00  |
| +0.1000 | +2.522  | +2.542  | +2.500  | +2.524  | +0.24 |
| +0.2000 | +5.004  | +5.025  | +5.000  | +5.006  | +0.06 |
| +0.3000 | +7.505  | +7.527  | +7.500  | +7.508  | +0.08 |
| +0.4000 | +9.982  | +9.982  | +10.000 | +9.982  | -0.18 |

*Max. linearity error is 0.24% of full range. Hysteresis is 0.17% of full range.

TORSIONAL: Range: ±25 degrees

| Displacement | Output (Volts) | | Theoretical | Average | Linearity |
|--------------|----------|----------|---------------|------------|-----------|
| (inches)     | Forward  | Backward | Value (Volts) | Output (V) | (%)       |
| -25.00 | -10.006 | -10.006 | -10.000 | -10.024 | +0.24 |
| -20.00 | -8.003  | -8.001  | -8.000  | -8.011  | +0.11 |
| -15.00 | -6.012  | -5.986  | -6.000  | -6.008  | +0.08 |
| -10.00 | -4.012  | -3.987  | -4.000  | -4.009  | +0.09 |
| -5.00  | -2.006  | -1.984  | -2.000  | -2.004  | +0.04 |
| 0.00   | .000    | +0.018  | 0.000   | 0.000   | 0.00  |
| +5.00  | +2.003  | +2.020  | +2.000  | +2.003  | +0.03 |
| +10.00 | +4.003  | +4.020  | +4.000  | +4.003  | +0.03 |
| +15.00 | +6.005  | +6.037  | +6.000  | +6.012  | +0.12 |
| +20.00 | +8.024  | +8.045  | +8.000  | +8.026  | +0.26 |
| +25.00 | +10.013 | +10.013 | +10.000 | +10.013 | +0.13 |

*Max. linearity error is 0.26% of full range. Hysteresis is 0.18% of full range.

DIAMETRAL: RANGE: ±0.1000 inches

| Displacement | Output (Volts) | | Theoretical | Average | Linearity |
|--------------|----------|----------|---------------|------------|-----------|
| (inches)     | Forward  | Backward | Value (Volts) | Output (V) | (%)       |
| -0.1000 | -10.006 | -10.006 | -10.000 | -10.006 | +0.06  |
| -0.0750 | -7.502  | -7.501  | -7.500  | -7.502  | +0.02  |
| -0.0500 | -5.004  | -5.003  | -5.000  | -5.004  | +0.04  |
| -0.0250 | -2.504  | -2.499  | -2.500  | -2.502  | +0.02  |
| 0.0000  | 0.000   | 0.000   | 0.000   | 0.000   | 0.00   |
| +0.0250 | +2.497  | +2.511  | +2.500  | +2.504  | +0.04  |
| +0.0500 | +4.998  | +4.999  | +5.000  | +4.998  | -0.02  |
| +0.0750 | +7.499  | +7.496  | +7.500  | +7.497  | -0.03  |
| +0.1000 | +10.010 | +10.010 | +10.000 | +10.010 | +0.010 |

*Max. linearity error is 0.10% of full range. Hysteresis is 0.00% of full range.

EXPERIMENTAL RESULTS

Figure 5:
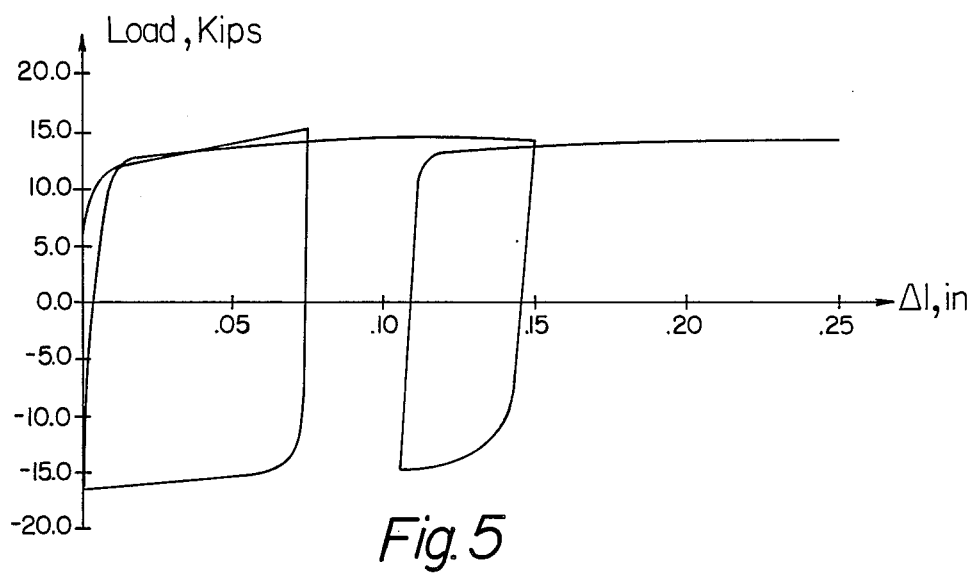
FIG. 5 is a graph depicting the axial load deformation curve.
Figure 6:
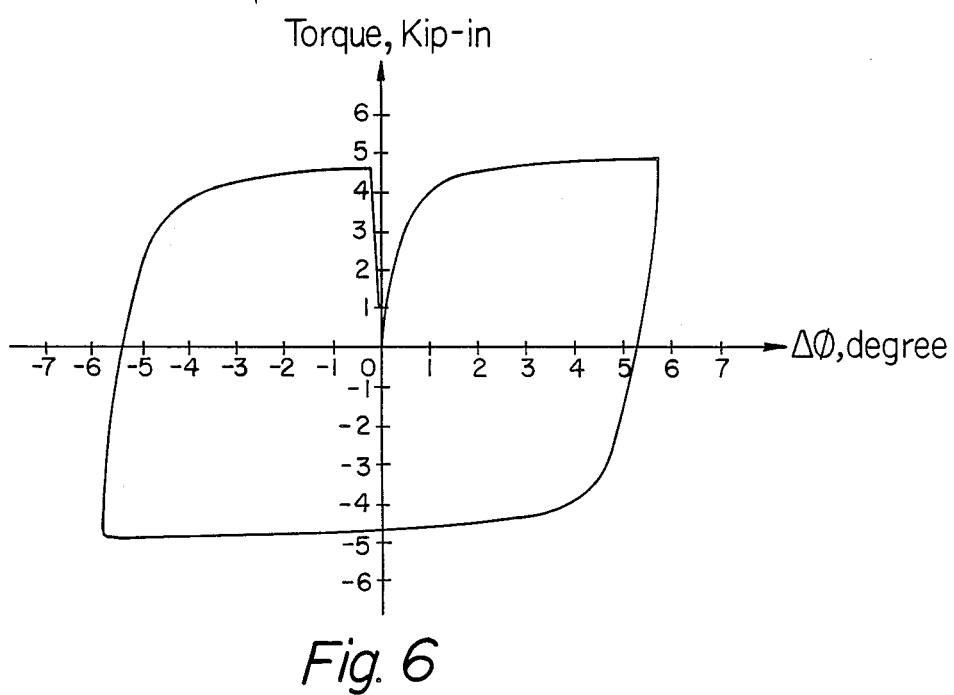
FIG. 6 is a graph depicting the response curve to torsion at constant axial strain.
Figure 7:
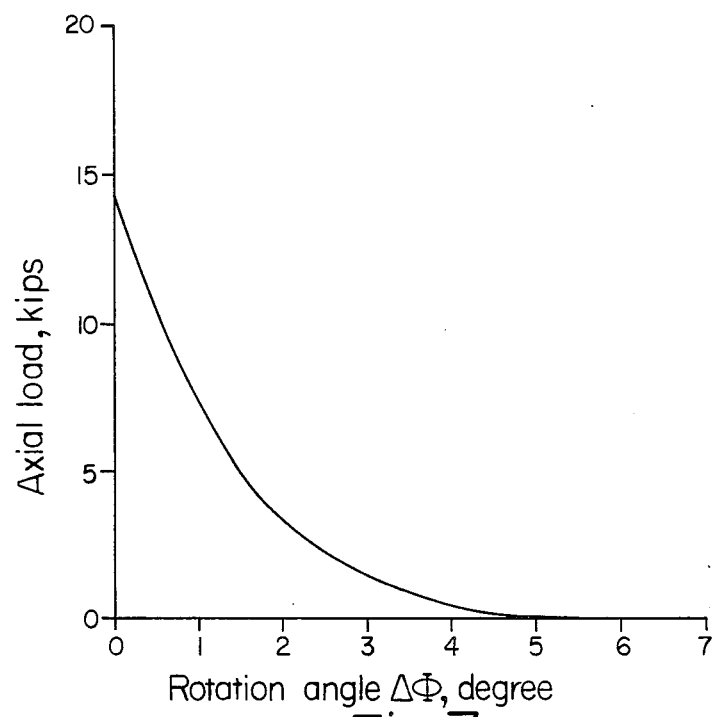
FIG. 7 is a graph depicting the variation of axial load during torsion.
Figure 8:
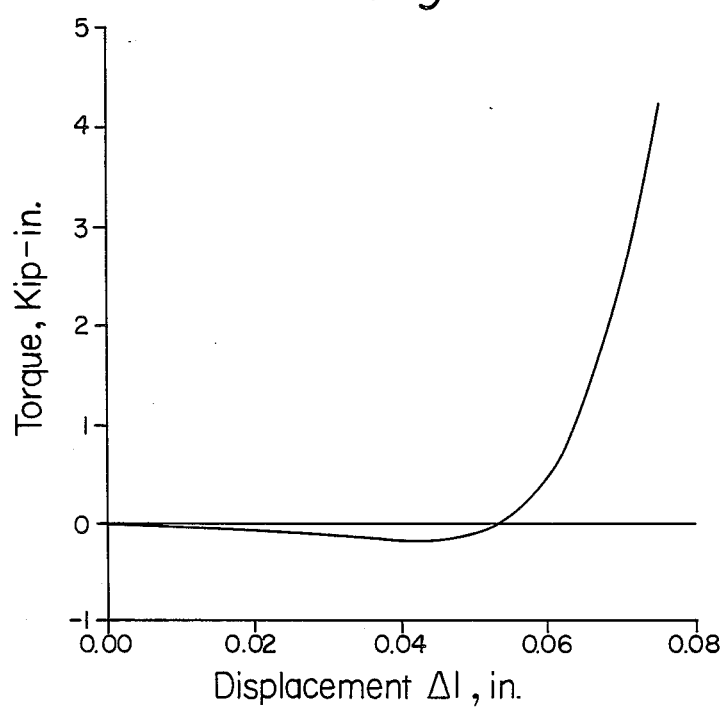
FIG. 8 is a graph depicting the variation of torque during axial deformation.

Using two annealed 3004 aluminum specimens, two strain-controlled tests by use of this extensometer (10) were conducted. The gage length (102) is 1.5 inches and the outside diameter and inside diameter of the tubular specimen (100) are 1.5 inches and 1.25 inches, respectively. The first test was a torsion-reversed torsion test, and a shear strain of about plus or minus 13%, which is equivalent to a strain range of 26% was achieved. The second test was a combined axial-torsion test, in which the specimen was first strained in tension to 5% axial strain; then, with the axial strain holding constant at 5%, the specimen was twisted to a shear strain of +5% and then reversely twisted to a shear strain of -5%, and subsequently twisted back to return to a zero shear strain; with shear strain at zero, the axial strain was reduced to zero; finally, the specimen (100) was subjected to an axial straining to 10%, unstraining to 7% and then restraining to 17% before fracture occurred. "Strain" is defined with respect to initial gage length (102) to provide a quick visualization of the amount of deformation. The experimental results are presented in FIGS. 5-8 in terms of relative displacement $\Delta l$ and angle of rotation $\Delta\phi$ of the gage section for the purpose of rigorous study. FIG. 5 shows the axial load versus $\Delta l$ curve throughout the test program; FIG. 6 shows the torque versus $\Delta\phi$ curve; FIG. 7 shows the decrease in axial load during shearing while keeping the axial displacement $\Delta l$ constant; and FIG. 8 shows the decrease in torque when $\Delta l$ is being pushed back to zero while keeping the shear strain at zero. The coupled effect as shown in FIGS. 5-8 is critical in the study of constitutive equations.

Heretofore, and extensometer that measures an controls normal and shear strain at large strain range was not generally available, particularly for combined axial-torsional loading condition. Experimental data taken under this loading condition is needed. The experimental data may be used by theorists to develop and verify constitutive models at large strain range. In addition, the experimental investigation has an independent value and its importance should be recognized in its own right. The design of the extensometer (10) satifies the specified requirements. This extensometer (10) is suitable for use in the investigation of plastic deformation and/or low cycle fatigue of tubular and solid cylindrical specimens (100). The calibration data and the error bounds of the extensometer (10) are presented above. An application to combined axial-torsional loading of a metal tubular specimen (100) is given. The ability of the extensometer (10) to measure the diametral strain also makes it suitable for use in the testing of materials, such as porous materials, where the volume change is important.

This extensometer (10) has been built for testing at room temperature. However, there is a high potential of extending the principle of this design to use in testings at elevated or depressed temperatures. In that case, appropriate materials should be used to make the device, and cooling should be added.

Thus, it can be seen that at least all of the stated objectives have been achieved.

Obviously, many modifications and variations of the present invention are possible in light of the above teachings. It is therefore to be understood that, within the scope of the appended claims, the invention may be practised otherwise than as specifically described.

We claim:

1. An axial-torsional extensometer for measuring deformation of a specimen subjected to combined axial-torsional loading conditions, said specimen including ends and an intermediate gage section, said extensometer comprising:

means for applying axial and torsional forces to the ends of said specimen;

a first holder plate;

a first set ring attached to said first holder plate, said first set ring including means for securing said first set ring to said specimen at a first axial location;

a first guide tube attached to said first holder plate and disposed laterally of said first set ring;

a second holder plate;

a second set ring rotatably attached to said second holder plate, said second set ring including means for securing said second set ring to said specimen at a second axial location axially spaced from said first axial location, the axial spacing of said first and second set rings defining the length of said gage section of said specimen;

a second guide tube attached to said second holder plate and disposed laterally of said second set ring, said second guide tube being disposed to engage said first guide tube to secure said first and second holder plates in radial alignment;

axial measuring means operably attached to said first and second guide tubes for measuring the axial deformation of said specimen;

torsional measuring means operably attached to said second holder plate for measuring the torsional deformation of said specimen.

2. The extensometer of claim 1 wherein said axial measuring means is a linear variable differential transducer.

3. The extensometer of claim 1 wherein said torsional measuring means is a rotary variable differential transducer.

4. The extensometer of claim 1 wherein said first and second guide tubes are telescopically engaged.

5. The extensometer of claim 1 wherein said first set ring securing means includes pins attached to and disposed to extend radially inward from said first set ring to contact said specimen.

6. The extensometer of claim 5 further including:
   means for biasing said pins toward said specimen; and
   diametral measuring means operably attached to said first set ring and one of said pins for measuring the diametral deformation of said specimen.

7. The extensometer of claim 6 wherein said diametral measuring means is a linear variable differential transducer.

8. The extensometer of claim 1 wherein said second set ring securing means includes pins attached to and disposed to extend radially inward from said second set ring to contact said specimen.

9. The extensometer of claim 8 further including:
   means for biasing said pins toward said specimen; and
   diametral measuring means operably attached to said second set ring and one of said pins for measuring the diametral deformation of said specimen.

10. The extensometer of claim 9 wherein said diametral measuring means is a linear variable differential transducer.

* * * * *